April 26, 1960

A. F. HAYEK 2,933,932

VARIABLE SPEED DRIVE

Filed Feb. 28, 1958

INVENTOR.
ARTHUR F. HAYEK

BY

ATTORNEY.

April 26, 1960

A. F. HAYEK 2,933,932

VARIABLE SPEED DRIVE

Filed Feb. 28, 1958

INVENTOR.
ARTHUR F. HAYEK

BY

ATTORNEY.

United States Patent Office 2,933,932
Patented Apr. 26, 1960

2,933,932

VARIABLE SPEED DRIVE

Arthur F. Hayek, Pleasantville, N.Y., assignor to General Precision, Inc., a corporation of Delaware Application February 28, 1958, Serial No. 718,370

4 Claims. (Cl. 74—198)

This invention relates to a variable speeed drive mechanism and is particularly directed to a variable speed drive mechanism capable of generating rotational movement at a rate which is proportional to a function of a known quantity. More specifically, the invention is directed to a variable speed drive mechanism of the ball-disc-roller type wherein the speed ratio between the input and output may be varied by moving the friction drive elements radially of the disc. Such drive mechanisms are particularly adapted for use in integrators, differentiators and in devices for performing other mathematical functions, such as multiplication, division, addition and subtraction.

In general, these devices comprise a disc journalled on an axis at right angles to the axis of a roller. Either the disc or the roller can be used as the driving or driven member, but usually the disc is the driving member. The friction drive between the roller and disc is provided either by a single ball or two balls in series frictional driving engagement between the disc and roller and the balls are controllably guided radially of the disc by a suitable carriage. The adjustment of the carriage is usually made in accordance with a function of some quantity to vary the diameter of the frictional driving circle on the disc to thereby vary the drive speed ratio accordingly.

One of the difficulties with the ball disc integrator of the type briefly outlined above is the wear on the center of the disc that occurs when the integrator is operated with the ball engaging the center of the disc. In this position the roller and the two balls are stationary and only the disc is rotating. The relative movement between the ball and the disc causes wear on both of them. However, in actual use, it is found that the wear on the ball is spread uniformly over its surface in the course of many trips through dead center. The disc, on the other hand, has its wear always concentrated at the center. It is for this reason that the disc becomes pitted at the center.

In order to avoid the difficulty of this wear on the disc, in one instance representing an example of the prior art, the roller is divided into two sections with one section being driven through a ball friction drive engaging the disc at a point on one side of the axis of the disc and the other roller being driven by a ball friction drive engaging a diametrically opposite point on the disc. The two cylinder sections are dynamically connected together through a differential mechanism. The two friction ball drives are adjustably guided in unison along a diameter of the disc at positions accurately fixed relative to each other.

However, the two-drive arrangement greatly reduces the range of the speed changing ratio that can be provided with the result that the accuracy of the input quantity must be increased by the same ratio. In addition to this disadvantage, such an arrangement is complex in that it requires the addition of a differential.

In another prior proposal a differential has been connected between the disc shaft and the roller shaft of a single-drive device to bias the friction drive to a zero position for the ball at some position intermediate the center and the periphery of the disc. This arrangement, while avoiding the possible scoring of the disc and ball at the center position has the same disadvantage of complexity and the reduced speed changing ratio as does the two-drive arrangement.

Various arrangements have been proposed heretofore for either eliminating or reducing the rotational or twisting slipping between the disc and the ball because this is the critical point. Any twisting slipping which might take place between the ball and the roller, is not critical because in this event, the wear is distributed around the periphery of the roller over an area as wide as the contact area. Accordingly, in one of the specific prior proposals, the center portion of the disc has been provided with a roughened surface in order to increase the friction between the disc and the ball to thus insure that friction torque between the disc and the ball will be sufficient to make the ball rotate about an axis which is colinear with the axis of rotation of the disc. In another prior proposal, complex means are provided to selectively orient guide rollers that engage the ball to provide free rolling guidance friction on the ball which is less than the friction between the disc and the ball. Both of these proposals have practical disadvantages because in the first instance the surface of a disc must be extremely hard and substantially undeformable and in the second instance, the anti-friction mechanism has been very complex.

It is the primary object of the present invention to provide an improved variable speed friction drive without the disadvantages of the devices mentioned above.

Another object is to provide an improved, simple accurate variable speed drive mechanism which will be inexpensive to manufacture and reliable and efficient in operation.

Another object is to reduce the friction between the ball and the carriage to such an extent that the normal friction between the disc and the ball will cause the latter to rotate about the axis of the disc when the ball is in the zero position so that relative rotational movement will not take place at this point.

Other and further objects will become apparent from the following description when considered in connection with the accompanying drawings in which.

Broadly speaking, this invention relates to an arrangement for apportioning the total frictional torque resistance between the various frictional surfaces or points of contact so that substantially no relative torsional movement takes place between the ball and the center of the disc.

Figure 1:
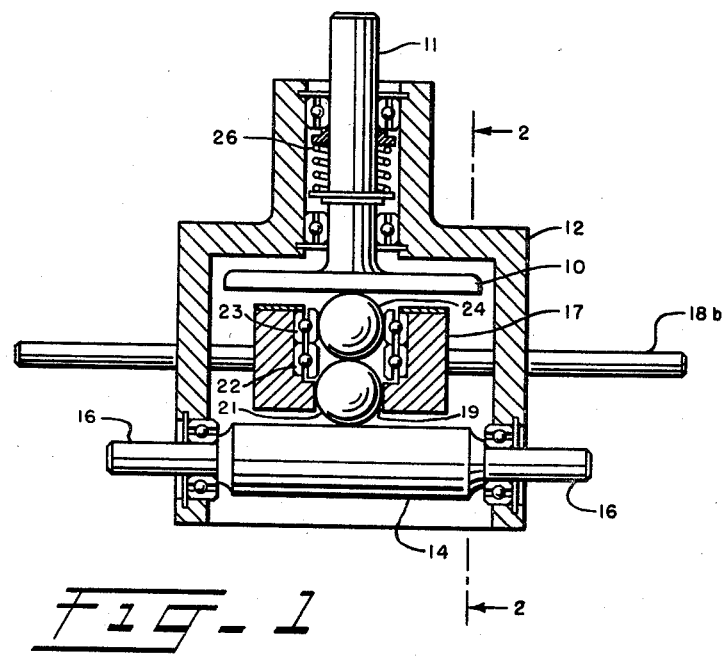
Figure 1 is a cross-sectional view of a variable drive mechanism in accordance with the present invention.

Referring to Fig. 1, illustrating one embodiment of the invention, the disc 10 is mounted on a suitable shaft 11 journalled in bearings supported by a casing 12. A roller 14 is carried by a shaft 16 also suitably journalled in bearings supported by the casing 12, the axis of rotation of the roller 14 being at right angles to the axis of the disc shaft 11 and passing through the center of the axis of the shaft 16. A carriage 17 is slidably mounted with respect to the casing 12 on a pair of parallel rods 18a, 18b; rod 18a being fixed to casing 12 and engaging a slotted boss 19 on the carriage 17 while rod 18b is fixed to carriage 17 and slidably engages the opposite walls of the casing 12. The rods 18a, 18b are parallel with the roller 14 to a very high degree of tolerance. The position of the carriage 17 is controlled through the rod 18b.

Figure 2:
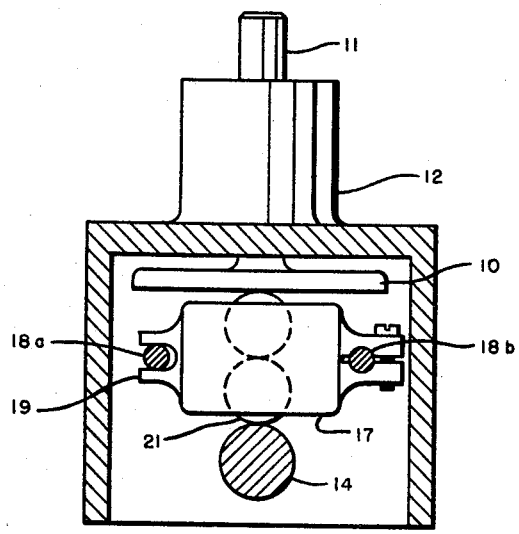
Figure 2 is an end cross-sectional view on the line 2—2 of Fig. 1.

In all three embodiments shown in the drawings, two balls are in frictional engagement with each other with one ball being in frictional engagement with the disc and the other in frictional drive engagement with the roller 14, the balls being held in guided stacked relation by means carried by the carriage 17. To this end, in the first embodiment shown in Figs. 1 and 2 the carriage 17 has a central opening the lower part of which is an accurately ground bore 19 providing an accurate close guiding fit with a ball 21. The upper end of the central opening is enlarged to receive the outer races of anti-friction ball bearings 22 and 23 the inner races of which are of such size as to provide a close guiding fit with a second ball 24. The latter rests upon ball 21 and is in frictional driving relation with the disc 10. The shaft 11 carrying the disc 10 is urged toward the roller 14 by means of a spring 26 which reacts against a suitable anti-friction thrust bearing, thus holding the disc 10 in tight frictional engagement with the upper ball 24, pressing the latter against the ball 21 and in turn holding it in driving frictional engagement with the roller 14.

Figure 3:
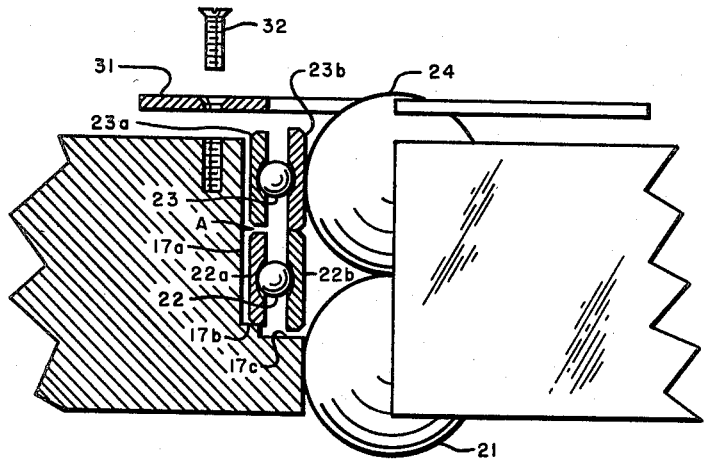
Figure 3 is a partially exploded view showing an enlarged partial cross-sectional detail of the ball and carriage assembly in accordance with the present invention.
Figure 4:
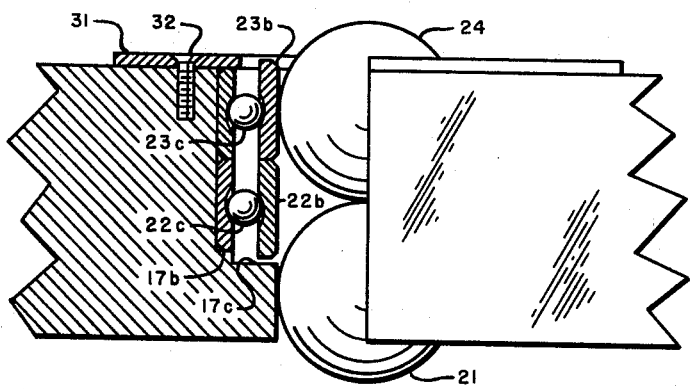
Figure 4 shows the assembled elements of Fig. 3.

The backlash between the inner and outer races of the bearings 22 and 23 can be adjustably minimized by mounting the bearings in accordance with standard practice in such a manner that a certain amount of relative axial displacement is applied so that the balls partially ride up the edge of the grooves in the races. This is illustrated in Figs. 3 and 4 which show how the method of assembly automatically applies the proper amount of relative displacement of the races. This will also show why it is necessary to use the two bearings 22 and 23 in order to accomplish the end result of providing a close guiding fit between the inner race of the bearing 23 and at the same time leaving this race free to turn with the ball 24 when the latter is at the zero position of the disc 10.

The large upper bore 17a of the carriage 17 terminates at an annular step 17b against which the outer race 22a of the lower bearing rests. Annular landing 17c is far enough below the top of the step 17b to permit the inner race 22b to be displaced sufficiently to take out all of the backlash in the bearing.

Before the bearings are assembled, as shown in Fig. 3, the end faces of the outer races 22a and 23a are ground off to leave the space indicated at A when the inner races 22b and 23b are engaged as shown in Fig. 3. Then a member, such as an annular ring plate 31 is pulled down against outer bearing race 23a by means of suitable screws 32 to the position shown in Fig. 4, thus forcing the two outer races 22a and 23a together at A and slightly displacing the ball bearings 22c and 23c from the center of the grooves in their respective races and thereby eliminating all of the backlash. It will be understood that the outer races are ground off by very precise amounts so that when the bearings are assembled as shown in Fig. 4, all of the backlash or looseness will be eliminated without causing any binding in the bearing. Although only the inner race 23b of the upper ball bearing engages the driving ball 24, the other bearing 22 is necessary to serve as the element to displace the inner race 23b and at the same time be free to rotate with it.

Referring now to the operation of the device, it will be noted that the contact surface between the disc 10 and the ball 24 will be larger than the contact area between the two balls 21 and 24 or the contact area between ball 21 and the roller 14 because the surface of the disc 10 is planar while the other surfaces are convex toward each other. It will be noted that when the carriage 17 is in such a position that the ball 24 contacts the exact center of the disc 10 frictional torque will be present at the points of contact between the disc 10 and ball 24, between the balls 21 and 24 and between the ball 21 and the roller 14. Relative rotational slipping will take place where the frictional torque resistance is the smallest. It will be noted that the area of contact between the ball 21 and the bore 19 of the carriage 17 will be substantially larger than that between the ball 21 and the ball 24 because the convex surface of the ball 21 is in nested relation to the concave surface of the bore 19 while the two surfaces of the balls 21 and 24 are convex toward each other and engage in substanially a point contact.

Due to the planar surface of disc 10, its area of contact with the ball 24 will be greater than the area of contact between the balls 21 and 24. Therefore, by providing the anti-friction bearing 23 between the upper ball 24 and the carriage 17 the friction torque between the disc 10 and the ball 24 will be greater than the frictional torque resistance acting on the ball 24 and therefore the latter will rotate with the disc 10, thus reducing the wear on its center. As previously mentioned, the rotational movement between the balls 24 and 21 is not critical in view of the fact that during the continued operation of the device the wear on the balls 24 and 21 will be distributed throughout their whole surface. In other words, each time the ball 24 is brought to the center of the disc a different part of the surface of the balls will be in contact with each other.

Figure 5:
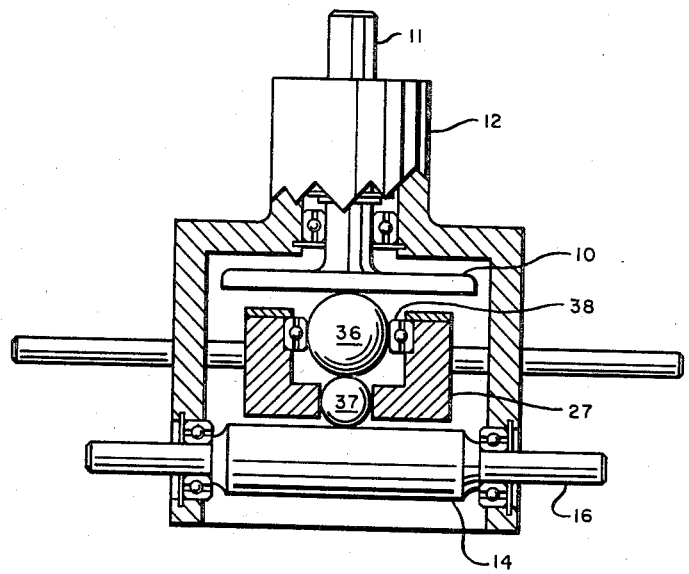
Figure 5 is a cross-sectional view of a second embodiment.

The second embodiment in Fig. 5 is very similar to that of the first embodiment shown in Figs. 1 to 4, the main distinction being that in Fig. 5, an upper ball 36 which contacts the disc 10 is substantially larger in diameter than that of the lower ball 37. The larger ball provides greater frictional driving area between the disc 10 and the ball 36 than in the previous embodiment. The carriage 27 is similar to the carriage 17 of Fig. 1 except that the sizes of the upper and lower openings are different. The inner race of the upper anti-friction bearing 38 has a close fit with the ball 36 while the opening in the lower part of the carriage 27 has a close but free-rolling guiding fit with the ball 37 in the same manner as the construction described in the first embodiment. Although only one anti-friction bearing is illustrated in Fig. 5 is should be understood that the double bearing arrangement similar to that shown in Figs. 1, 3 and 4 could be used in order to minimize backlash.

Figure 6:
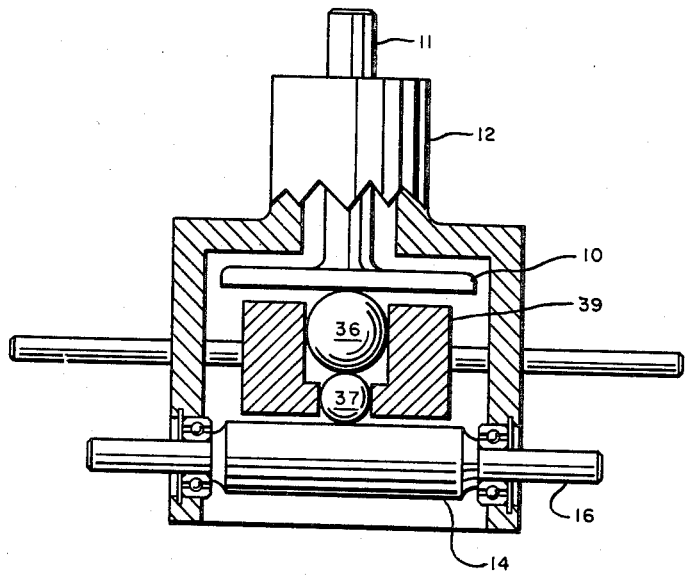
Figure 6 is a cross-sectional view of a third embodiment.

In view of the comparatively large contact area between the planar surface of the disc and the large ball 36 it may not be necessary under some circumstances to provide an anti-friction bearing between the large ball 36 and the carriage. Such a construction would appear as in Fig. 6 where the upper portion of the central opening 39a of the carriage 39 has a close but free-rolling guiding fit with the ball 36. As in Fig. 5 the lower ball 37 has a similar close fit with the lower portion of the central opening in the carriage 39.

What is claimed is:

1. In a variable speed transmission, a disc rotatable about a fixed axis, a roller rotatable about an axis normal to the axis of rotation of said disc, a friction driving means comprising a ball in frictional driving engagement between said disc and said roller, a carriage for guiding said ball radially of said disc to vary the diameter of the driving circle on said disc, said carriage having a center opening surrounding said ball and being of such size as to accommodate an anti-friction bearing, said bearing including an inner race having a close but free-rolling fit with said ball whereby when said carriage moves said frictional driving means to zero position at the center of the disc the rotational resistance between said ball and said carriage about an axis colinear with the axis of rotation of said disc will be less than the frictional driving torque between the disc and said ball so that said ball will rotate with said disc when engaging the center of the disc.

2. In a variable speed transmission, a disc rotatable about a fixed axis, a roller rotatable about an axis normal to the axis of rotation of said disc, friction driving means comprising first and second balls in frictional driving engagement between said disc and said roller, said first ball being in engagement with said disc and said second ball being in engagement with said roller, a carriage for guiding said friction driving members radially of said disc to vary the diameter of the driving circle on said disc, said carriage having a central opening surrounding said friction driving balls, the portion of said opening surrounding said first ball being of such size as to accommodate an anti-friction bearing, said bearing including an inner race having a close but free-rolling fit with said first ball whereby when said carriage moves said frictional driving means to zero position at the center of the disc, the rotational resistance between said first ball and said carriage about an axis colinear with the axis of rotation of said disc will be less than the frictional driving torque between the disc and said first ball so that said first ball will rotate with said disc when said first ball engages the center of the disc, the portion of the opening in said carriage surrounding said second ball being of such size as to provide an accurate, close but free-rolling fit with said second ball.

3. In a variable speed transmission, a disc rotatable about a fixed axis, a roller rotatable about an axis normal to the axis of rotation of said disc, friction driving means comprising first and second balls in frictional driving engagement between said disc and said roller; said first ball being in engagement with said disc and said second ball being in engagement with said roller, a carriage for guiding said friction driving members radially of said disc to vary the diameter of the driving circle on said disc, said first ball being larger in diameter than said second ball, said carriage having a central opening with different portions of different respective diameters to provide accurate, close but free-rolling fit with the respective balls, whereby when said carriage moves said frictional driving means to zero position at the center of the disc the rotational resistance between said first ball and said carriage about an axis colinear with the axis of rotation of said disc will be less than the frictional driving torque between the disc and said first ball so that said first ball will rotate with said disc when said first ball engages the center of the disc.

4. In a variable speed transmission, a disc rotatable about a fixed axis, a roller rotatable about an axis normal to the axis of rotation of said disc, friction driving means comprising first and second balls in frictional driving engagement between said disc and said roller, said first ball being in engagement with said disc and said second ball being in engagement with said roller, a carriage for guiding said friction driving members radially of said disc to vary the diameter of the driving circle on said disc, said carriage having a central opening surrounding said friction driving balls and an annular seat, the portion of said opening surrounding said first ball and above said seat being of such size as to accommodate an anti-friction bearing, a second anti-friction bearing coaxial with said first bearing, each of said bearings comprising concentric inner and outer races with balls between said races, said races having respective annular grooves facing each other, the groove in at least one of said bearings being placed relative to the ends of its races so that when the bearing is normally assembled in unstressed condition one end of one race will be axially offset relative to the corresponding end of the other race, said bearings being assembled in coaxial relation with the outer race of said second bearing engaging the annular seat in said carriage with the outer race engaging said seat the ends of the inner races will be in engagement with each other while the outer races will be spaced by the amount by which the ends of said races are offset and means on said carriage for holding said bearings in assembled relation with a selected amount of relative displacement between said inner and outer races so that when said bearings are assembled with the outer races in engagement the respective inner and outer races will be so relatively displaced as to cause the balls to partially ride up on the walls of their grooves and thereby eliminate any backlash.

References Cited in the file of this patent

UNITED STATES PATENTS

| | | |
|---|---|---|
| 2,002,585 | Rothwell, Jr. et al. | May 28, 1935 |
| 2,357,035 | Treese et al. | Aug. 29, 1944 |
| 2,512,700 | Van Auken | June 27, 1950 |